US011975695B2

(12) United States Patent
Gaucher et al.

(10) Patent No.: US 11,975,695 B2
(45) Date of Patent: May 7, 2024

(54) ADAPTER FOR A WIPER SYSTEM

(71) Applicant: Valeo Systèmes d'Essuyage, Le Mesnil Saint Denis (FR)

(72) Inventors: Vincent Gaucher, Le Mesnil Saint Denis (FR); Stéphane Houssat, Le Mesnil Saint Denis (FR); Eric Poton, Le Mesnil Saint Denis (FR); Olivier Jomard, Le Mesnil Saint Denis (FR)

(73) Assignee: VALEO SYSTÈMES D'ESSUYAGE, Le Mesnil Saint Denis (FR)

( * ) Notice: Subject to any disclaimer, the term of this patent is extended or adjusted under 35 U.S.C. 154(b) by 0 days.

(21) Appl. No.: 17/823,751

(22) Filed: Aug. 31, 2022

(65) Prior Publication Data
US 2023/0063910 A1 Mar. 2, 2023

(30) Foreign Application Priority Data

Sep. 1, 2021 (FR) .................................... 21 09138

(51) Int. Cl.
*B60S 1/40* (2006.01)
*B60S 1/04* (2006.01)

(52) U.S. Cl.
CPC .............. *B60S 1/4087* (2013.01); *B60S 1/40* (2013.01); *B60S 1/0408* (2013.01); *B60S 1/4083* (2013.01)

(58) Field of Classification Search
CPC .... B60S 1/4045; B60S 1/4048; B60S 1/4083; B60S 1/4087; B60S 1/0408; B60S 2001/4054; B60S 1/40; B60S 1/34
USPC ...................................................... 15/250.32
See application file for complete search history.

(56) References Cited

FOREIGN PATENT DOCUMENTS

| DE | 1199640 B | | 8/1965 |
|---|---|---|---|
| DE | 102011053090 | * | 5/2013 |
| DE | 102016211162 A1 | | 12/2017 |
| FR | 2781741 A1 | | 2/2000 |
| FR | 3059960 | * | 6/2018 |
| WO | 2015-052580 A1 | | 4/2015 |
| WO | 2020-125975 A1 | | 6/2020 |

OTHER PUBLICATIONS

Machine translation of description portion of French publication 3059960, published Jun. 2018. (Year: 2018).*
Preliminary Search Report and Written Opinion in corresponding French Application No. 2109138, dated May 17, 2022 (6 pages).

* cited by examiner

*Primary Examiner* — Gary K. Graham
(74) *Attorney, Agent, or Firm* — Osha Bergman Watanabe & Burton LLP

(57) ABSTRACT

An adapter (1) for securing a wiper on an arm of a wiper system, the adapter (1) extending in a longitudinal direction (L), the adapter (1) being configured to be fitted such as to rotate on a connector of the wiper around an axis of rotation transverse to the longitudinal direction (L), the adapter (1) comprising at least one lateral wall (10) and one upper wall (12), the lateral wall (10) and the upper wall (12) participating in defining an inner volume of the adapter (1), the adapter (1) comprising an inner wall (20) extending at least partly into the inner volume of the adapter (1), the adapter (1) comprises a locking device (22) which is designed to render the adapter integral longitudinally relative to the arm of the wiper system, the locking device being fitted such as to pivot on the upper wall around an axis of pivoting.

15 Claims, 4 Drawing Sheets

[Fig. 1]
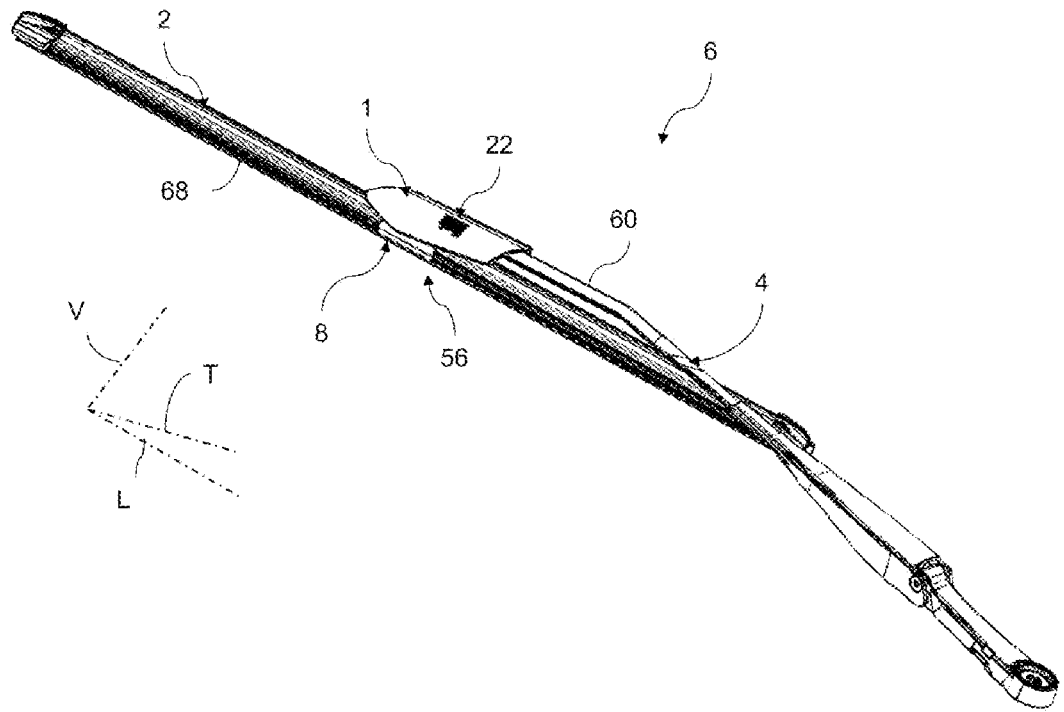
[Fig. 2]
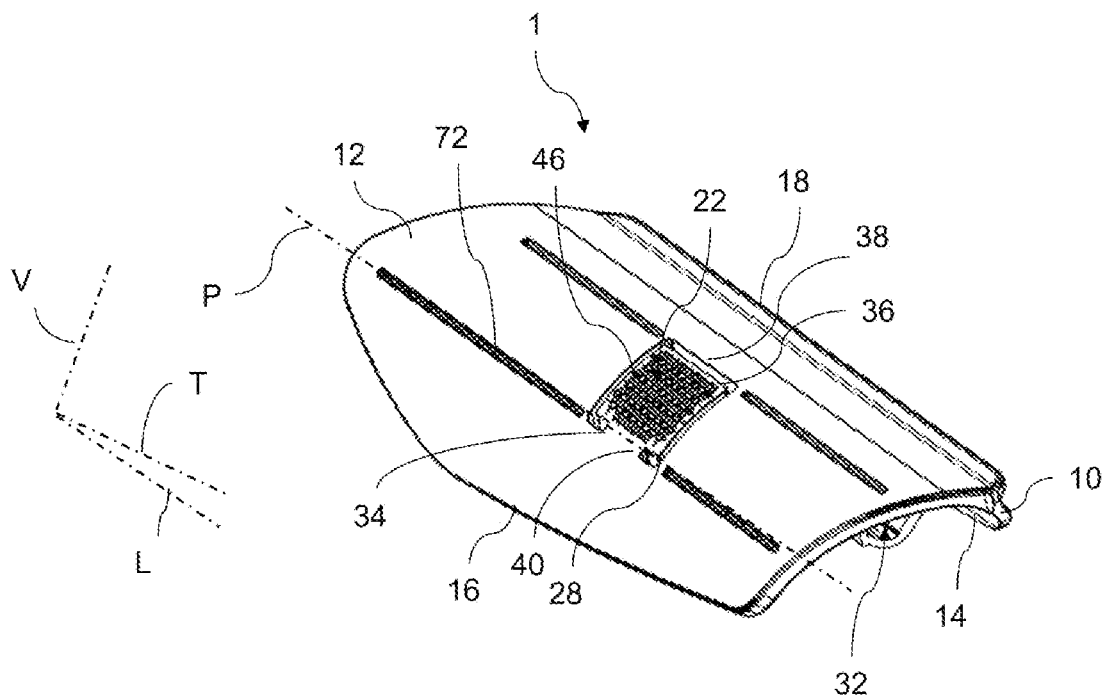

[Fig. 3]
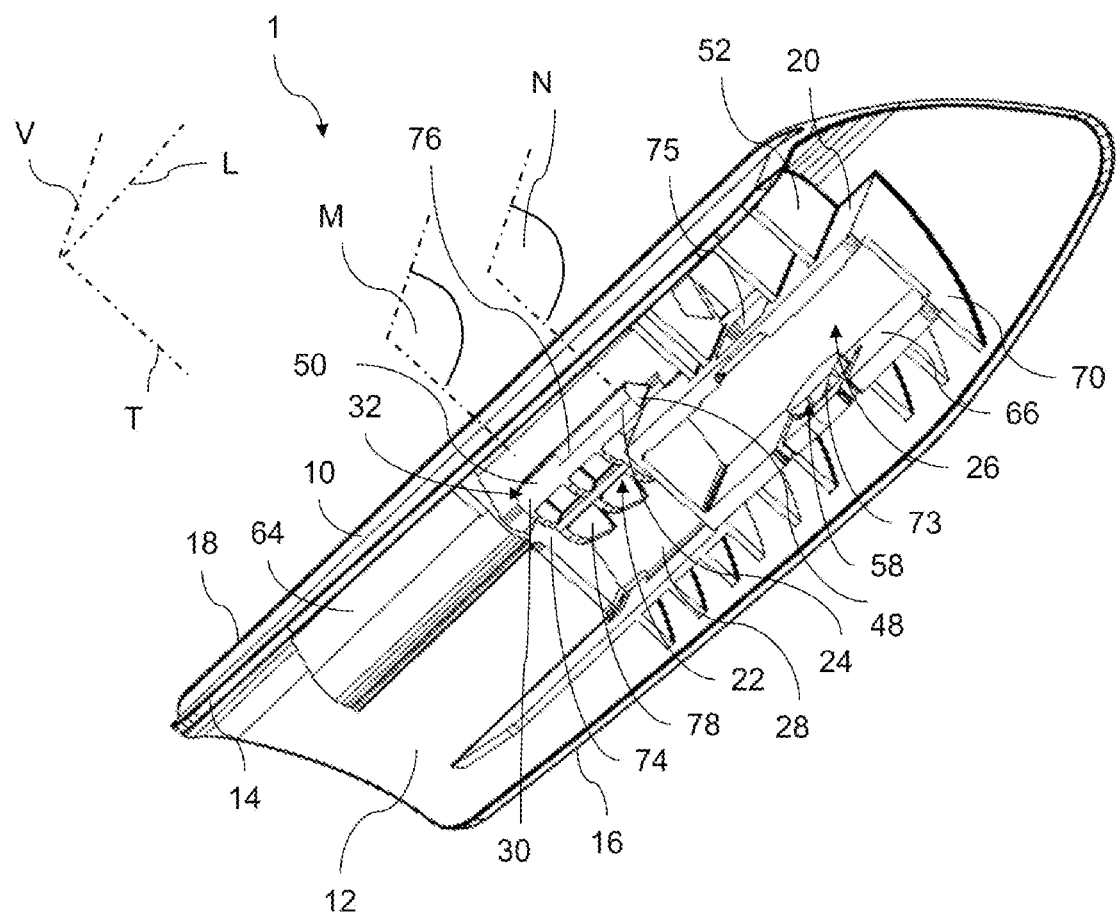

[Fig. 4]
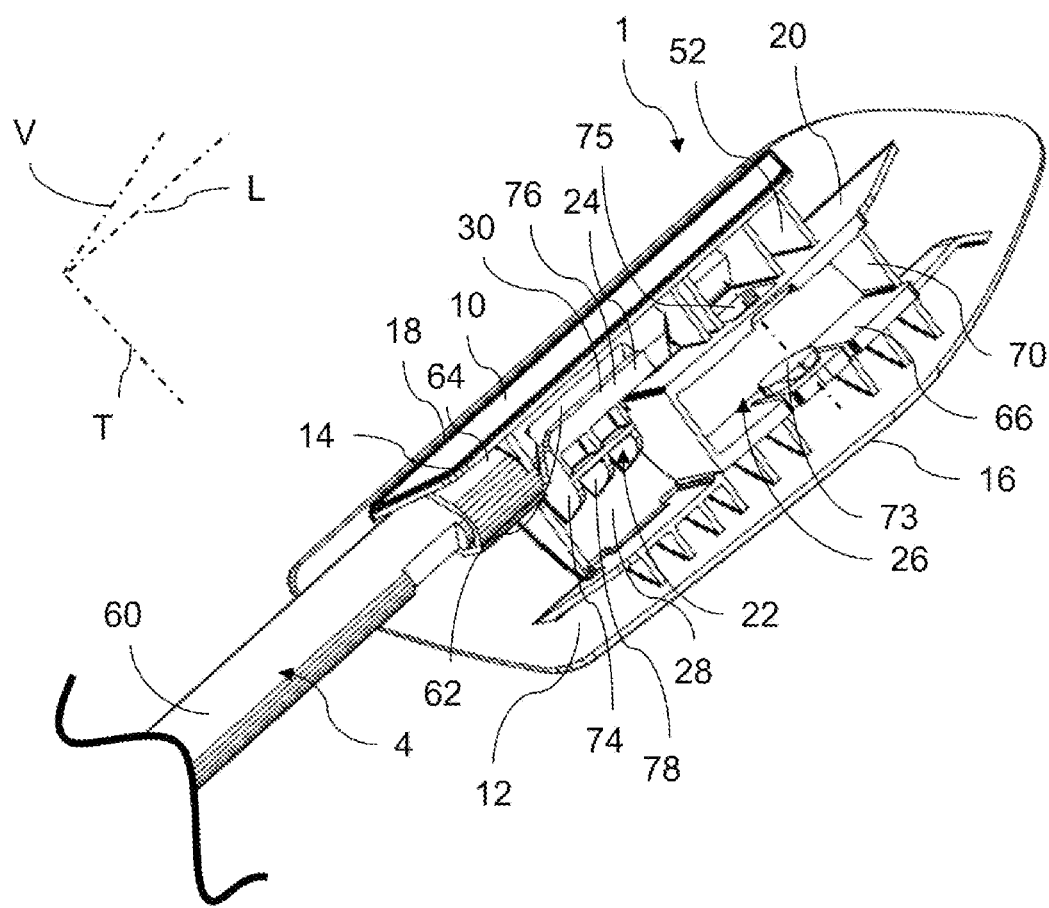

[Fig. 5]
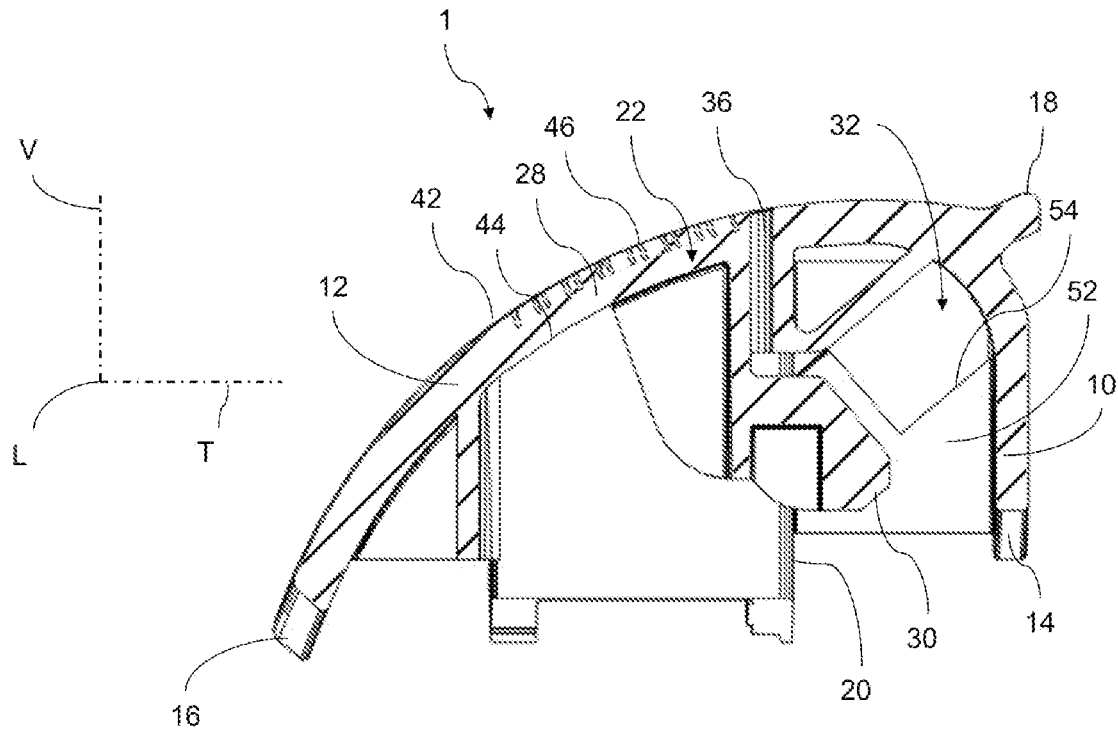
[Fig. 6]
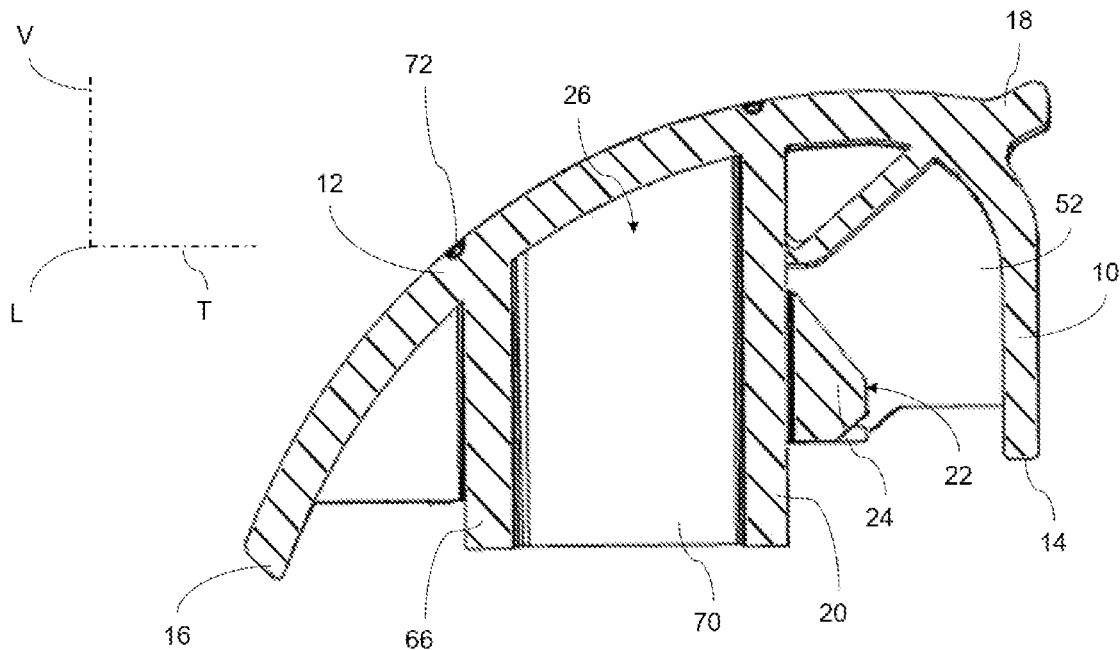

ADAPTER FOR A WIPER SYSTEM

The field of the present invention is that of wiper systems intended for motor vehicles. More particularly, the field of the present invention is that of adapters which are positioned between a wiper arm and a wiper of such wiper systems.

Motor vehicles are commonly equipped with wiper systems which are intended to clean their glazed surfaces, and in particular their windscreen. Such wiper systems comprise at least one wiper arm and one wiper which is driven by the wiper arm. The wiper arm is connected to an electric motor of the vehicle and the wiper comprises at least one wiper blade which is designed to come into contact with the glazed surface to be wiped. In order to be able to drive the wiper, an adapter is arranged between this wiper and the wiper arm. More particularly, the adapter is arranged between the wiper arm and a connector which is connected to the wiper. The adapter is thus integral with the wiper arm, and more particularly with a free end of the wiper arm, cooperation of this type being removable, such that the wiper can be replaced when it is worn.

In order to make cleaning of the glazed surface of vehicles optimal by means of wiper systems, the said wiper systems, and in particular their wipers, must be placed against the glazed surface to be cleaned. Thus, means which participate in putting the wipers into place are known, such as deflectors, which are positioned on the wipers, and, when the vehicle is travelling, ensure that the wipers are put into place under the effect of a flow of air. However, although the putting into place of the wiper blades is efficient, it is not optimal, and can thus be improved.

Furthermore, the fitting onto, and/or removal from the arm, of the wiper, is also not optimal. In fact, actuation of the locking device without minimum precautions can give rise to breakage thereof, or irreversible damages, therefore limiting its use.

The objective of the invention is thus to improve in a simple manner the putting into place of the wipers against the glazed surfaces, while permitting fitting and/or removal of the wiper, without giving rise to destruction of an element of the wiper. The putting into place of the wipers takes place in particular by generating a low-pressure area at the rear of the adapters, in a direction of circulation of the flow of air against the wiper system, thus improving the global performance levels of the wiper system.

The main objective of the invention is an adapter for securing a wiper on an arm of a wiper system, the adapter extending in a longitudinal direction, the adapter being configured to be fitted such as to rotate on a connector of a wiper around an axis of rotation transverse to the longitudinal direction, the adapter comprising at least one lateral wall and one upper wall, the lateral wall and the upper wall participating in defining an inner volume of the adapter, the adapter comprising an inner wall extending at least partly into the inner volume of the adapter, characterised in that the adapter comprises a locking device which is designed to render the adapter integral longitudinally relative to the arm of the wiper system, the locking device being fitted such as to pivot on the upper wall around an axis of pivoting, the locking device comprising a means for limiting the pivoting thereof, which means is supported against the inner wall.

The wiper and the arm form part of a wiper system of a vehicle, which system is intended to clean at least partly a glazed surface of the said vehicle. The wiper system thus comprises the arm which is rotated by an electric motor of the vehicle, and ensures the movement of rotation of the wiper, with which it is rendered integral via the adapter and the connector, against the glazed surface, such that the blade which is supported by the wiper clears from the glazed surface drops of rain and/or solid debris deposited thereon.

The locking device also participates in securing the adapter on the arm, by blocking the position of the adapter on the arm. By means of its pivoting, the locking device facilitates the fitting onto and/or removal from the arm, of the adapter, while limiting the breakage of a component element of the adapter and/or the arm.

The means for limiting the locking device blocks the pivoting of the locking device in at least one direction of pivoting thereof. It is understood in this case that the means for limiting makes it possible, for example by means of a stop, to prevent the locking device from pivoting around an excessively large angle, and thus limits the risk of breakage of a component element of the adapter and/or the arm.

According to the invention, the pivoting of the locking device is limited by the stop of the means 24 for limiting against the inner wall of the adapter.

According to an optional characteristic of the invention, the axis of pivoting is parallel to the longitudinal direction.

According to an optional characteristic of the invention, the lateral wall and the upper wall each have a free edge and an edge which is common to the lateral wall and to the upper wall, the adapter having a triangular cross-section seen on a plane perpendicular to the longitudinal direction, and defined by the free edge of the lateral wall, the free edge of the upper wall, and by the common edge between the lateral wall and the upper wall, the upper wall being curved between the common edge and its free edge seen on the plane perpendicular to the longitudinal direction.

In addition, the free edge of the upper wall corresponds to the edge which is positioned across the flow of air when the wiper system is positioned on the vehicle, with the flow of air lapping the upper wall. In other words, the free edge of the upper wall is the edge which is furthest forward of the vehicle when the wiper system is fitted on the said vehicle. It is thus understood that the free edge of the lateral wall and the lateral wall itself are positioned at the rear of the wiper system, between the glazed surface and the free edge of the upper wall, according to a trajectory of the flow of air, when the wiper system is fitted on the vehicle.

According to another optional characteristic of the invention, the curve of the upper wall between the common edge and its free edge seen on the plane perpendicular to the longitudinal direction is incorporated in a circle.

According to another optional characteristic of the invention, the inner wall participates in delimiting at least partly a receipt area which is designed to receive the connector. It is understood that the receipt area is delimited at least by the inner wall, but that other walls can contribute towards delimiting this receipt area. It is understood in this case that, once the connector is fitted on the adapter, it is positioned at least partly in the area for receipt of the adapter.

According to an optional characteristic of the invention, the inner wall has a contact face facing the means for limiting, and a guide face which participates in delimiting the receipt area, the means for limiting being supported against the contact face of the inner wall.

According to another optional characteristic of the invention, the locking device comprises at least one thrust unit and one blocking unit, the thrust unit being incorporated in a profile of the upper wall, whereas the blocking unit extends at least partly into a receipt receptacle which is designed to receive the arm.

It is understood that the thrust unit extends matching the form of the upper wall, with the thrust unit being flush with the upper wall for example. The thrust unit is also the unit of the locking device on which a user exerts force in order to allow the locking device to pivot.

In addition, the blocking unit is the unit of the locking device which is configured to be in contact with the arm, rendering the adapter integral with the arm, and/or releasing it therefrom.

According to another optional characteristic of the invention, the locking device comprises at least one hinge which connects the thrust unit to the upper wall, the thrust unit being surrounded by a groove which separates it from the upper wall. The hinged firstly permits pivoting of the locking device around the axis of pivoting, and secondly renders the locking device integral with the upper wall.

According to another optional characteristic of the invention, the thrust unit has a parallelepiped form, the thrust unit having at least one upper side and one lower side extending parallel to the longitudinal direction, the hinge being positioned between the lower side of the thrust unit and the upper wall, the groove extending over the three other sides of the thrust unit.

In this case, it is understood that the upper side is the side of the thrust unit which is closest to the common edge between the lateral wall and the upper wall, and the lower side is the side of the thrust unit which is closest to the free edge of the upper wall.

By means of this particularly clever arrangement, the pivoting of the locking unit makes it possible to position the blocking unit in the receipt receptacle, and/or remove it therefrom, thus rendering the adapter integral with the arm and/or releasing it therefrom.

According to another optional characteristic of the invention, the thrust unit has a curved profile seen in cross-section perpendicular to the longitudinal direction, the curved profile of the thrust unit being incorporated in a profile of the upper wall.

According to another optional characteristic of the invention, the thrust unit comprises an outer face which is oriented towards the exterior environment of the adapter, and an inner face which is oriented towards the inner volume of the adapter, the thrust unit having on its outer face a pattern which assists the adhesion. This pattern is for example graining of the outer face of the upper wall.

According to another optional characteristic of the invention, the means for limiting forms part of the blocking unit. In other words, the means for limiting and the blocking unit form an assembly in a single piece, i.e. the means for limiting and the blocking unit can not be separated from one another without giving rise to destruction of the means for limiting and/or the blocking unit.

According to another optional characteristic of the invention, the blocking unit is delimited longitudinally by an end face of the means for limiting. "End face" means a face which is positioned at a longitudinal end of the means for limiting.

According to another optional characteristic of the invention, the means for limiting is formed by a stop face which intersects the end face and faces the inner wall. More specifically, the stop face extends on a plane which intersects the plane on which the end face of the means for limiting extends.

According to another optional characteristic of the invention, the locking device pivots around the axis of pivoting according to a maximum angle of 20°.

Preferably, the angle of pivoting of the locking device is a maximum of 15°.

Even more preferably, the angle of pivoting of the locking device is a maximum of 10°.

According to another optional characteristic of the invention, the blocking unit extends from the thrust unit to the receipt receptacle, the blocking unit comprising a bent portion and a free end which is positioned in the receipt receptacle when the locking unit is in a position of locking of the adapter onto the arm.

According to another optional characteristic of the invention, the means for limiting extends the free end of the blocking unit longitudinally.

According to another optional characteristic of the invention, the adapter comprises at least one reinforcement extending between the inner wall and the lateral wall and/or the upper wall. In particular, the reinforcement comprises a wall extending for example mainly on a plane which is substantially perpendicular to the longitudinal direction. The reinforcement makes it possible to reinforce the structure of the adapter, and to increase its rigidity.

According to another optional characteristic of the invention, the reinforcement comprises an opening which participates in delimiting the receipt receptacle at least partly. It is understood that the opening is designed to receive at least part of the arm.

According to another optional characteristic of the invention, the receipt receptacle is offset laterally relative to the receipt area.

According to another optional characteristic of the invention, the receipt receptacle is closer to the lateral wall than the receipt area. In other words, the receipt receptacle is positioned between the receipt area and the lateral wall.

According to another optional characteristic of the invention, the receipt receptacle extends on a main plane of extension parallel to the longitudinal direction, the main plane of extension being seen on a median position of the said receipt receptacle, the main plane of extension of the receipt receptacle intersecting the receipt area.

According to another optional characteristic of the invention, the upper wall comprises at least one aeraulic disturbance device which extends in the longitudinal direction and is open to the exterior of the adapter.

According to another optional characteristic of the invention, the aeraulic disturbance device is in the form of a channel.

According to another optional characteristic of the invention, the aeraulic disturbance device is in the form of a rib.

In addition, the subject of the invention is also a connection device for a wiper comprising at least one connector and one adapter according to any one of the preceding characteristics, the connector being fitted such as to rotate around the axis of rotation by means of a rotation device.

The invention also concerns a wiper blade comprising at least one connection device according to the preceding characteristic, or an adapter according to any one of the preceding characteristics.

Finally, the subject of the invention is a wiper system comprising at least one wiper arm and one wiper according to the preceding characteristic, the arm comprising at least one rod which is accommodated in the receipt receptacle of the adapter. In this case, "rod" means a solid elongate element which for example has a rectangular or discoid cross-section, seen on a plane perpendicular to a main direction of extension of the rod.

According to another optional characteristic of the invention, at least one end of the rod has a form complementary to the receptacle for receipt of the adapter, the rod having a notch which cooperates with the locking device in order to block the position of the adapter on the rod longitudinally.

Other characteristics, details and advantages of the invention will become more apparent from reading the following description on the one hand, and from a plurality of embodiments provided by way of non-limiting indication, with reference to the appended schematic drawings on the other hand, in which:

FIG. 1 is a view in perspective of a wiper system comprising at least one arm, one wiper and one adapter according to the invention;

FIG. 2 is a view in perspective from above of the adapter represented in FIG. 1;

FIG. 3 is a view in perspective from below of the adapter represented in FIG. 1;

FIG. 4 is a view in perspective from below of the adapter and the arm represented in FIG. 1;

FIG. 5 is a transverse cross-section of the adapter represented in FIG. 1;

FIG. 6 is another transverse cross-section of the adapter represented in FIG. 1.

The characteristics, variants and different embodiments of the invention can be associated with one another, in various combinations, as long as they are not mutually incompatible or mutually exclusive. In particular, it is possible to conceive of variants of the invention that comprise only a selection of characteristics described hereinafter, independently of the other characteristics described, if this selection of characteristics is sufficient to provide a technical advantage and/or to differentiate the invention from the prior art.

In the figures, elements which are common to several figures retain the same reference.

In the following detailed description, the terms "longitudinal", "transverse" and "vertical refer to the orientation of a wiper system according to the invention. A longitudinal direction corresponds to a main direction of extension of an adapter according to the invention, this longitudinal direction being parallel to a longitudinal axis L of an L, V, T illustrated in the figures. A transverse direction corresponds to a direction in which a reinforcement mainly extends, this transverse direction being parallel to a transverse axis T of the reference L, V, T, and this transverse axis T being perpendicular to the longitudinal axis L. Finally, a vertical direction corresponds to a direction parallel to a vertical axis V of the reference L, V, T, this vertical axis V being perpendicular to the longitudinal axis L and the transverse axis T.

FIG. 1 illustrates a wiper system 6 which is configured to ensure the cleaning of a glazed surface of a vehicle, for example a windscreen, such as to improve the visibility which the driver has of the road in front of the vehicle, for example when it is raining, or also to clear from the said glazed surface solid debris which is adhering thereto. The wiper system 6 extends mainly in the longitudinal direction L, and comprises at least one wiper arm 4 which supports a wiper 2 at one end, and is connected to the vehicle at another, opposite end in the longitudinal direction L.

The arm 4 and the wiper 2 both extend mainly in the longitudinal direction L of the wiper system 6. More specifically, the arm 4 comprises a connection body which is intended to render the arm 4 integral with the vehicle, and a rod 60 which extends from the connection body to an end of the arm 4. "Rod" means a solid element which extends in the longitudinal direction L. In this case, the rod 60 has a rectangular cross-section, seen on a plane perpendicular to the longitudinal direction L. However, a rod 60 with a discoid, triangular or other cross-section would not depart from the scope of the invention.

In addition, in particular the wiper 2 is designed to be rotated by the arm 4 against the glazed surface of the vehicle, the arm 4 itself being rotated by a motor, not shown, for example an electric motor on board the vehicle.

In order to connect the wiper 2 to the end of the arm 4, the said wiper 2 comprises a connection device 56 comprising at least one connector 8 which supports a wiper blade 68 of the wiper 2, and an adapter 1 which is fitted such as to rotate on the connector 8, the adapter 1 being able to cooperate with the end of the arm 4. It is understood in particular that the wiper blade 68 of the wiper 2 is intended to be in contact with the glazed surface of the vehicle. In addition, the connector 8 is configured to support the wiper blade 68, directly or indirectly The adapter 1 and the connector 8 are rotated by means of a rotation device 58 (shown in FIG. 3), this rotation taking place around an axis of rotation R which is substantially parallel to the transverse direction T. A more detailed description of the rotation device 58 will be provided subsequently in the description.

As shown more particularly in FIGS. 2 and 3, the adapter 1 extends mainly in the longitudinal direction L. The adapter 1 comprises at least one lateral wall 10 and one upper wall 12, the lateral wall 10 and the upper wall 12 each having a free edge 14, 16 and an edge 18 which is common to the lateral wall 10 and the upper wall 12.

The lateral wall 10 extends mainly on a plane parallel to the longitudinal L and vertical V directions. In this case, the lateral wall 10 has a free edge 14 and an edge 18 in common with the upper wall 12, the common edge 18 joining the lateral wall 10 and the upper wall 12 which each extend on distinct planes.

The upper wall 12 also has a free edge 16, and extends between its free edge 16 and the common edge 18, while having a curve, as can be seen in particular in FIG. 5, which is a cross-section produced according to the cross-sectional plane M illustrated in FIG. 3. In this case, it is understood that the upper wall 12 has a curved profile between the common edge 18 and its free edge 16 seen on the plane perpendicular to the longitudinal direction L, and is incorporated in a circle.

In this configuration, the adapter 1 has a triangular cross-section seen on a plane perpendicular to the longitudinal direction L, the triangle of this cross-section being defined by the free edge 14 of the lateral wall 10, the free edge 16 of the upper wall 12, and by the common edge 18 between the lateral wall 10 and the upper wall 12. An inner volume of the adapter 1 can thus be defined, this inner volume being at least partly delimited by the lateral wall 10 and the upper wall 12. The inner volume extends mainly in the form of a straight prism with a triangular base.

In addition, the adapter 1 comprises an inner wall 20 extending at least partly in the inner volume of the adapter 1. More specifically, the inner wall 20 extends on a plane which is substantially parallel to the longitudinal L and vertical V directions, from the upper wall 12, in the inner volume. It is understood that the inner wall 20 extends substantially parallel to the lateral wall 10.

According to the invention, the inner wall 20 participates in delimiting at least partly a receipt area 26 which is designed to receive the connector 8. When the adapter 1 is fitted on the connector 8, the connector 8 is accommodated at least partly in the receipt area 26.

In addition, and as shown more particularly in FIGS. 3 and 4, the adapter 1 comprises a plurality of walls which participate in delimiting the receipt area 26, including in particular the inner wall 20. More particularly, these walls extend in the form of a rectangle, the walls extending on a plane which is substantially perpendicular to the planes on which the adjacent walls extend. It is thus understood that the adapter 1 comprises a longitudinal wall 66 extending parallel to the inner wall 20, and two lateral walls 70 extending perpendicularly to the longitudinal 66 and inner 20 walls, and therebetween.

In addition, once the connector 8 is fitted on the adapter 1, it is positioned at least partly in the receipt area 26 of the adapter 1. In other words, the connector 8 is positioned at least partly between the inner wall 20 and the longitudinal wall 66, and between the lateral walls 70.

As previously stated, the adapter 1 is fitted such as to rotate on the connector 8 by means of a rotation device 58. This device comprises a plurality of elements which cooperate with one another, and are positioned firstly on the connector 8 and secondly on the adapter 1.

For example, and as shown in FIGS. 3 and 4, the adapter 1 comprises firstly a male element 73 on the longitudinal wall 66 which is configured to cooperate with a female element of the connector 8, and secondly a female element 75 which is intended to cooperate with a male element of the connector 8.

More specifically, the male elements are in the form of a tongue bearing a torus, and the female elements are in the form of an orifice in which the torus is intended to be rotated around the axis of rotation R. The tongue of the adapter 1 extends for example on a plane which is combined with the plane on which the longitudinal wall 66 extends, and is delimited relative to the said longitudinal wall 66 by at least one groove, and advantageously at least two grooves, extending in the vertical direction V. In this configuration, the tongue is resiliently deformable, while being mobile around a direction of rotation parallel to the longitudinal direction L, such as to allow the adapter 1 to be fitted on the connector 8.

According to the invention, and as illustrated in FIGS. 3 to 5, the adapter 1 comprises a locking device 22 which is designed to render the adapter 1 integral longitudinally relative to the arm 4 of the wiper system 6, the locking device 22 that is a pivot member being fitted such as to pivot on the upper wall 12 around an axis of pivoting P, the locking device 22 comprising a means 24 for limiting its pivoting, which is supported against the inner wall 20.

More particularly, the locking device 22 comprises at least one thrust unit 28 and one blocking unit 30, the thrust unit 28 being incorporated in a profile of the upper wall 20, whereas the blocking unit 30 extends at least partly into a receipt receptacle 32 which is designed to receive the arm 4. A more detailed description of the receipt receptacle 32 will be provided after the description of the locking device 22.

As illustrated in FIGS. 2 to 5, the thrust unit 28 extends matching the form of the upper wall 12, with the thrust unit 28 being flush with the upper wall 12. The thrust unit 28 is also the unit of the locking device 22 on which a user exerts force in order to allow the locking device 22 to pivot around the axis of pivoting P.

According to the invention, the thrust unit 28 has a curved profile seen in a cross-section perpendicular to the longitudinal direction L, the curved profile of the thrust unit 28 being incorporated in a profile of the upper wall 12. In this case, it is understood that the upper wall 12 and the thrust unit 28 each have a curved profile which is incorporated in the same circle.

The thrust unit 28 is surrounded by a groove 36 which separates it from the upper wall 12. It is understood that the groove 36 passes through the upper wall 12 from one side to another, while delimiting the thrust unit 28. In this case, the groove 36 has a rectangular form.

When seen from above, the thrust unit 28 also has a globally parallelepiped form, the thrust unit 28 having at least one upper side 38 and one lower side 40 extending parallel to the longitudinal direction L, and two transverse sides extending perpendicularly to the upper 38 and lower 40 sides, and substantially parallel to the transverse direction T. More specifically, the upper side 38 of the thrust unit 28 is positioned closer to the common edge 18 between the lateral wall 10 and the upper wall 12, than to the free edge 16 of the upper wall 12, whereas the lower side 40 is positioned closer to the free edge 16 of the upper wall 12, than to the common edge 18 between the lateral wall 10 and the upper wall 12.

In addition, the locking device 22 comprises at least one hinge 34 connecting the thrust unit 28 to the upper wall 12, thus permitting the pivoting of the locking device 22. The hinge 34 is positioned between the lower side 40 of the thrust unit 28 and the upper wall 12, the groove 36 extending mainly on the three other sides of the thrust unit 28. In this case, the hinge 34 is in the form of a bridge between the thrust unit 28 and the upper wall 12, these three elements thus forming an element in a single piece, i.e. one of the elements can not be separated without giving rise to destruction of one or more of the three elements.

As illustrated in FIG. 2, the groove 36 in this case extends partly between the lower side 40 of the thrust unit 28 and the upper wall 12, thus optimising the pivoting of the thrust unit 28.

In addition, the thrust unit 28 has an outer face 42 which is oriented towards the exterior environment of the adapter 1, and an inner face 44 which is oriented towards the inner volume of the adapter 1, the thrust unit 28 having on its outer face 42 a pattern 46 which assists the adhesion. It is understood that a user using the thrust unit will have optimised adhesion thanks to the presence of this pattern 46.

This pattern 46 is for example graining of the outer face 42 of the thrust unit 28. However, a thrust unit 28 comprising another pattern 46 would not depart from the scope of the invention.

In addition, the upper wall 12 also comprises at least one aeraulic disturbance device 72 which extends in the longitudinal direction L, and is open on the exterior of the adapter 1.

According to the example illustrated here in FIG. 2, the aeraulic disturbance device 72 is in the form of a channel.

According to an alternative example of the invention, the aeraulic disturbance device 72 is in the form of a rib.

The blocking unit 30 for its part is the unit of the locking device 22 which is configured to be in contact with the arm 4, rendering the adapter 1 integral with the arm 4 and/or releasing it therefrom. It is understood that it is the unit which interacts with the arm 4 in order to secure the adapter 1 onto the said arm 4.

As can be seen more particularly in FIG. 5, the blocking unit 30 extends from the thrust unit 28 to the receipt receptacle 32, the blocking unit 30 comprising a bent portion 74 and a free end 76 which is positioned in the receipt receptacle 32 when the locking unit is in a position of locking of the adapter 1 onto the arm 4.

It is understood in this case that the bent portion 74 firstly comprises a first part extending from the thrust unit 28 on a first plane, and secondly a second part extending on a second plane which intersects the first plane towards the free end 76, the bent portion 74 comprising a connection part which connects the first part to the second part. For example, the first plane is parallel to the longitudinal L and vertical V directions, the second plane extending parallel to the longitudinal L and transverse T directions. In addition, the bent portion 74 can comprise at least one support wall 78 which optimises the rigidity of the bent portion 74.

The free end 76 for its part is in the form of a shaft extending mainly in the longitudinal direction L.

According to the invention, the means 24 for limiting forms part of the blocking unit 30. More particularly, the means 24 for limiting and the blocking unit 30 form an assembly in a single piece, i.e. the means 24 for limiting and the blocking unit 30 can not be separated from one another without giving rise to the destruction of the means 24 for limiting and/or of the blocking unit 30. In this case, the means 24 for limiting extends the free end 76 longitudinally towards the receipt area 26. In other words, the free end 76 comprises a protuberance which extends the shaft forming the free end 76 longitudinally towards the receipt area 26, with the protuberance acting as the means 24 for limiting.

In this case, the means 24 for limiting has an end face 48 parallel to the transverse T and vertical V directions, and a stop face 50 which intersects the end face 48 and faces the inner wall 20. It can also be understood that the blocking unit 30 is delimited longitudinal by the end face 48 of the means 24 for limiting.

In addition, the inner wall 20 has a contact face facing the means 24 for limiting, and a guide face which participates in delimiting the receipt area 26.

As illustrated in FIG. 6, which is a cross-section provided on a cross-sectional plane N illustrated in FIG. 3, the means 24 for limiting is supported against the contact face of the inner wall 20, such as to limit the displacement of the locking device 22 during its use, in order to release the adapter from the arm 4.

In other words, the means 24 for limiting is more particularly formed by the stop face 50 which intersects the end face 48, and faces the contact face of the inner wall 20. In addition, the stop face 50 and the contact face each extend on a plane parallel to the longitudinal direction.

The stop face 50 of the means 24 for limiting participates in delimiting the amplitude of pivoting of the locking device 22. More specifically, when the locking device 22 is pivoted around the axis of pivoting P, the stop face 50 of the means 24 for limiting comes into contact with the contact face of the inner wall 20 participating in delimiting the receipt area 26, thus blocking the pivoting of the locking device 22.

In other words, the means 24 for limiting the locking device 22 blocks the pivoting of the locking device 22 in at least one direction of pivoting thereof. In this case, it is understood that the means 24 for limiting makes it possible in particular, for example by means of the stop between the stop face 50 of the means 24 for limiting and the inner wall 20, to prevent the locking device 22 from pivoting by an excessively large angle, and thus limits the risk of breakage of a component element of the adapter 1 and/or of the arm 4.

According to the invention, the locking device 22 pivots around the axis of pivoting P according to a maximum angle of 20° measured between a plane on which the stop face 50 extends when the free end 76 is positioned in the receipt receptacle 32, and the plane on which the contact face of the inner wall 20 extends.

Preferably, the angle of pivoting of the locking device 22 is a maximum of 15°.

Even more preferably, the angle of pivoting of the locking device 22 is a maximum of 10°.

In addition, the adapter 1 comprises at least one reinforcement 52 extending between the inner wall 20 and the lateral wall 10 and/or the upper wall 12. In particular, the reinforcement 52 comprises a wall extending mainly for example on a plane substantially perpendicular to the longitudinal direction. The reinforcement 52 makes it possible to reinforce the structure of the adapter 1, and to optimise its rigidity.

As can be seen in FIG. 3, the reinforcement 52 comprises an opening 54 which participates in limiting at least partly the receipt receptacle 32. It is understood that the opening 54 is designed to receive at least part of the rod 60 of the arm 4.

In addition, and as can be seen in FIGS. 3 to 5, as well as being defined by the opening 54 of the reinforcement 52, the receipt receptacle 32 is at least partly defined by a sleeve 64 and the lateral wall 10 and/or the upper wall 12. In this arrangement, and as illustrated more particularly in FIG. 4, the opening 54 of the reinforcement 52 and the sleeve 64 are aligned in a direction parallel to the longitudinal direction L, the rod 60 of the arm 4 thus extending in the longitudinal direction L, through the sleeve 64 and the opening 54 of the reinforcement 52.

According to the invention, the receipt receptacle 32 is offset laterally relative to the receipt area 26. In other words, the position of the receipt receptacle 32 is offset relative to the receipt area 26 in the transverse direction T. The position of the receipt receptacle 32 is also offset relative to the receipt area 26 in the vertical direction V.

More specifically, the receipt receptacle 32 is closer to the lateral wall 10 than to the receipt area 26. In other words, the receipt receptacle 32 is positioned between the receipt area 26 and the lateral area 10. Even more specifically, the receipt receptacle 32, the common edge 18 and the receipt area 26 are aligned in a medium direction, the receipt receptacle 32 being positioned between the common edge 18 and the receipt area 26.

It can thus be defined that the receipt receptacle 32 extends on a main plane of extension parallel to the longitudinal direction and to the median direction, the main plane of extension being seen in a medium position of the said receipt receptacle 32, the main plane of extension of the receipt receptacle 32 intersecting the receipt area 26.

In addition, at least one end of the rod 60 has a form which is complementary to the receipt receptacle 32 of the adapter 1, the rod 60 having a notch 62 which cooperates with the locking device 22 in order to block the position of the adapter 1 longitudinally on the rod 60. It is understood that the free end 76 is positioned in the notch 62 of the rod 60, such as to block the rod 60 in the receipt receptacle 32.

It is understood that, in order to unlock the position of the adapter 1 on the arm 4, the locking device 22 is pivoted around the direction of pivoting, until the means 24 for limiting abuts the inner wall 20. This pivoting is sufficient to unblock the position of the adapter 1 relative to the arm 4, while limiting the risk of breakage of the locking device 22.

However, the present invention is not limited to the means and configurations described and illustrated here, and also extends to any equivalent means and configurations, as well as to any technically operative combination of such means.

The invention claimed is:

1. An adapter for securing a wiper on an arm of a wiper system, the adapter extending in a longitudinal direction, the adapter being configured to be fitted such as to rotate on a connector of the wiper around an axis of rotation transverse to the longitudinal direction, the adapter comprising:

at least one lateral wall and one upper wall, the lateral wall and the upper wall defining an inner volume of the adapter;

an inner wall extending at least partly into the inner volume of the adapter; and a pivot member including at least one thrust unit incorporated in the upper wall and one blocking unit locking of the adapter onto the arm, and which is configured to render the adapter integral longitudinally relative to the arm of the wiper system, wherein the blocking unit extends into the inner volume, the pivot member being fitted such as to pivot on the upper wall around an axis of pivoting, the pivot member comprising a means for limiting the pivoting thereof, which means is supported against the inner wall, wherein the lateral wall and the upper wall each have a free edge and an edge which is common to the lateral wall and to the upper wall, the adapter having a triangular cross-section seen on a plane perpendicular to the longitudinal direction, and defined by the free edge of the lateral wall, the free edge of the upper wall, and by the common edge between the lateral wall and the upper wall, the upper wall being continuously curved between the common edge and its free edge seen on the plane perpendicular to the longitudinal direction.

2. The adapter according to claim 1, wherein the inner wall participates in delimiting at least partly a receipt area which is configured to receive the connector.

3. The adapter according to claim 1, wherein the means for limiting is formed by a stop face which intersects an end face and faces the inner wall.

4. The adapter according to claim 1, wherein the pivot member pivots around the axis of pivoting according to a maximum angle of 20°.

5. An adapter for securing a wiper on an arm of a wiper system, the adapter extending in a longitudinal direction, the adapter being configured to be fitted such as to rotate on a connector of the wiper around an axis of rotation transverse to the longitudinal direction, the adapter comprising:

at least one lateral wall and one upper wall, the lateral wall and the upper wall defining an inner volume of the adapter;

an inner wall extending at least partly into the inner volume of the adapter; and a pivot member including at least one thrust unit incorporated in the upper wall and one blocking unit locking of the adapter onto the arm, and which is configured to render the adapter integral longitudinally relative to the arm of the wiper system, the pivot member being fitted such as to pivot on the upper wall around an axis of pivoting, the pivot member comprising a means for limiting the pivoting thereof, which means is supported against the inner wall, and wherein the thrust unit is incorporated in a profile of the upper wall, whereas the blocking unit extends at least partly into a receipt receptacle provided within the inner volume which is intended to receive the arm.

6. The adapter according to claim 5, wherein the pivot member further comprises at least one hinge which connects the thrust unit to the upper wall, the thrust unit being surrounded by a groove which separates it from the upper wall.

7. The adapter according to claim 6, wherein the thrust unit has a parallelepiped form, the thrust unit having at least one upper side and one lower side extending parallel to the longitudinal direction, the hinge being positioned between the lower side of the thrust unit and the upper wall, the groove extending over three other sides of the thrust unit.

8. The adapter according to claim 5, wherein the thrust unit has a curved profile seen in cross-section perpendicular to the longitudinal direction, the curved profile of the thrust unit being incorporated in a profile of the upper wall.

9. The adapter according to claim 5, wherein the thrust unit comprises an outer face which is oriented towards an outer environment of the adapter, and an inner face which is oriented towards the inner volume of the adapter, the thrust unit having on its outer face a pattern which assists an adhesion.

10. The adapter according to claim 5, wherein the means for limiting forms part of the blocking unit.

11. The adapter according to claim 5, wherein the blocking unit is delimited longitudinally by an end face of the means for limiting.

12. A connection device for a wiper comprising at least one connector and one adapter according to claim 5, the connector being fitted such as to rotate around the axis of rotation by means of a rotation device.

13. A wiper comprising at least one connection device according to claim 12.

14. A wiper system comprising at least one arm and one wiper according to claim 13 the arm comprising at least one rod which is accommodated in the receipt receptacle of the adapter.

15. An adapter for securing a wiper on an arm of a wiper system, the adapter extending in a longitudinal direction, the adapter being configured to be fitted such as to rotate on a connector of the wiper around an axis of rotation transverse to the longitudinal direction, the adapter comprising:

at least one lateral wall and one upper wall, the lateral wall and the upper wall defining an inner volume of the adapter;

an inner wall extending at least partly into the inner volume of the adapter; and a pivot member including at least one thrust unit incorporated in the upper wall and one blocking unit locking of the adapter onto the arm, and which is configured to render the adapter integral longitudinally relative to the arm of the wiper system, wherein the blocking unit extends into the inner volume, the pivot member being fitted such as to pivot on the upper wall around an axis of pivoting, the pivot member comprising a means for limiting the pivoting thereof, and the pivot member supporting the arm parallel to the wiper in the longitudinal direction.

* * * * *